(12) United States Patent
Maconi et al.

(10) Patent No.: US 7,475,107 B2
(45) Date of Patent: Jan. 6, 2009

(54) SYSTEM AND METHOD FOR MANAGING DISTRIBUTED COMPUTER PROCESSES

(75) Inventors: Chris Maconi, Redmond, WA (US); Mathew T. Brown, Seattle, WA (US); Alex Kutner, Seattle, WA (US); Keith Newham, Seattle, WA (US); John H. Jessen, Bellevue, WA (US)

(73) Assignee: Electronic Evidence Discovery, Inc., Kirkland, WA (US)

( * ) Notice: Subject to any disclaimer, the term of this patent is extended or adjusted under 35 U.S.C. 154(b) by 697 days.

(21) Appl. No.: 10/361,749

(22) Filed: Feb. 6, 2003

(65) Prior Publication Data

US 2004/0006589 A1   Jan. 8, 2004

Related U.S. Application Data

(63) Continuation-in-part of application No. 10/192,683, filed on Jul. 8, 2002, now Pat. No. 7,370,072.

(51) Int. Cl.
   G06F 15/16 (2006.01)
(52) U.S. Cl. .................... 709/202; 709/201; 709/226; 709/224; 707/103 R; 707/1; 719/316
(58) Field of Classification Search ............ 707/1, 707/103, 103 R; 709/201, 202, 226, 224; 719/316
   See application file for complete search history.

(56) References Cited

U.S. PATENT DOCUMENTS

| | | |
|---|---|---|
| 5,737,727 A | 4/1998 | Lehmann et al. |
| 5,813,009 A | 9/1998 | Johnson et al. |
| 6,055,562 A | 4/2000 | Devarakonda et al. |

(Continued)

FOREIGN PATENT DOCUMENTS

WO   WO 99/59062 A1   11/1999

(Continued)

OTHER PUBLICATIONS

"Method Sending Object Agent and Receiving Object Agent," *IBM Technical Disclosure Bulletin* 39(12):43, Dec. 1996.

(Continued)

*Primary Examiner*—Tonia L Dollinger
*Assistant Examiner*—Kyung H Shin
(74) *Attorney, Agent, or Firm*—Christensen O'Connor Johnson Kindness PLLC

(57) ABSTRACT

A system and method for processing data on a plurality of distributed computing devices. In accordance with one aspect of the invention, a system and method prioritizes and distributes computing tasks over a network of computers. One embodiment, remote computers communicate signals indicative of the availability of computing resources to a server. The server determines if at least one computer has available resources that match the requirements of at least one stored computing task. If the server determines that an available resource matches at least one computing task, an agent storing the computing task is communicated to the computer for execution of the task. In accordance with another aspect, a system and method provide an improved knowledge based system utilizing a set of expressions displayed on a graphical user interface to configure and view software objects that process and manage data.

15 Claims, 8 Drawing Sheets

U.S. PATENT DOCUMENTS

| | | | |
|---|---|---|---|
| 6,065,040 | A | 5/2000 | Mima et al. |
| 6,088,689 | A | 7/2000 | Kohn et al. |
| 6,151,583 | A | 11/2000 | Ohmura et al. |
| 6,175,855 | B1 | 1/2001 | Reich et al. |
| 6,233,586 | B1 | 5/2001 | Chang et al. |
| 6,233,601 | B1 | 5/2001 | Walsh |
| 6,263,342 | B1 | 7/2001 | Chang et al. |
| 6,272,488 | B1 | 8/2001 | Chang et al. |
| 6,272,582 | B1 | 8/2001 | Streitenberger et al. |
| 6,282,563 | B1 | 8/2001 | Yamamoto et al. |
| 6,343,311 | B1 | 1/2002 | Nishida et al. |
| 6,370,541 | B1 | 4/2002 | Chou et al. |
| 6,418,463 | B1 | 7/2002 | Blevins |
| 6,434,595 | B1 | 8/2002 | Suzuki et al. |
| 6,477,563 | B1 | 11/2002 | Kawamura et al. |
| 6,496,871 | B1 | 12/2002 | Jagannathan et al. |
| 6,502,109 | B1 | 12/2002 | Aravamudan et al. |
| 6,922,685 | B2 * | 7/2005 | Greene et al. .................. 707/1 |
| 2003/0093434 | A1 * | 5/2003 | Stickler .................. 707/103 R |

FOREIGN PATENT DOCUMENTS

| | | | |
|---|---|---|---|
| WO | WO 01/09831 | A2 | 2/2001 |

OTHER PUBLICATIONS

Falchuk, B., and A. Karmouch, "Visual Modeling for Agent-Based Applications," *IEEE Computer 31*(12):31-38, Dec. 1998.

Goscinski, A., and M. Bearman, "Resource Management in Large Distributed Systems," *Operating Systems Review 24*(4): Oct. 7-25, 1990.

Obelöer, W., et al., "Load Management With Mobile Agents," *in Proceedings of the 24th EUROMICRO Conference vol. 2 (EUROMICRO 98)*, IEEE Computer Society, Vesteras, Sweden, Aug. 25-27, 1998, pp. 1005-1012.

* cited by examiner

SYSTEM AND METHOD FOR MANAGING DISTRIBUTED COMPUTER PROCESSES

CROSS REFERENCE TO RELATED APPLICATION

This application is a continuation-in-part of U.S. application Ser. No. 10/192,683, filed Jul. 8, 2002, now U.S. Pat. No. 7,370,072 and entitled SYSTEM AND METHOD FOR COLLECTING ELECTRONIC EVIDENCE DATA, priority from the filing date of which is hereby claimed under 35 U.S.C. §120. The subject matter of application Ser. No. 10/192,683 is specifically incorporated herein by reference.

FIELD OF THE INVENTION

The present invention is related to software and computer hardware and, more particularly, to knowledge based control systems for managing and integrating distributed computer processes.

BACKGROUND OF THE INVENTION

In recent years, technology related to data processing systems has seen progressive advances. In certain areas, such as data storage and data management, it is now common for a corporate system to include a large number of system components that are individually configured to handle different types of tasks. For instance, one computer may be configured to manage and process e-mail, another computer may be configured to archive compressed data, and another computer may be configured to store and control user access to electronic documents. In such a distributed computing environment, in which different software applications and different data file formats are distributed among many nodes in a network, a continuing need exists for a management system to coordinate data processed in each component.

There exists a large number of software applications and systems that provides many services, such as data format conversion systems, data compression systems, e-mail servers, etc. For instance, there are many software applications configured to process e-mail messages, such as an e-mail server application. As can be appreciated by one skilled in the art, most existing e-mail server applications are capable of receiving, sending, and storing e-mail messages. In addition, most existing e-mail server applications are capable of selectively retrieving e-mail records based on a user-configured query.

While existing systems, such as an e-mail server, are effective in executing their specific functions, there are several disadvantages. One disadvantage stems from the fact that an individual system, such as an e-mail server, cannot efficiently coordinate data retrieval capabilities with other software applications or other individual systems. For example, it may be desirous to retrieve specific image records from an email database, decompress the image records, and then perform an optical character recognition (OCR) process on the image records. Such a task may be carried out by the use of a customized program or a script; however, these existing solutions in coordinating functions between different systems may require a substantial amount of human resources to design and implement.

In addition to the above-described problems, existing systems do not effectively coordinate process workloads between the various components of a data processing system. For instance, using the example described above, a customized program or a script may be designed to extract compressed e-mail records from an e-mail server and then send the records to another data conversion system to decompress the compressed e-mail records. In such a task, the processes being executed by the data conversion system may take longer than the processes being executed by the e-mail server. This mismatch of processing time may cause process bottlenecks, and thus cause various inefficiencies during the execution of each task. Additional problems are introduced to such solutions when implemented on a distributed system, since various systems may reside on different computer platforms, i.e., Unix versus Windows-based systems.

The inefficient nature of existing data processing systems is further impaired when executing large-scale data processing tasks, such as data processing and data collection tasks related to litigation discovery. As litigants and regulatory agencies have increased their focus of evidence discovery on data stored in computer systems, the amount of resources required for electronic evidence data collection has exponentially increased. Accordingly, the discovery process of identifying, locating, collecting and reviewing voluminous amounts of potentially relevant data has become increasingly difficult. Most existing programs do not have the capabilities to efficiently process such large quantities of data on distributed systems.

Most existing systems and programs also fail to provide capabilities for implementing a unified record management policy on distributed systems storing various types of data. For example, existing systems do not provide an efficient way to apply a unified record retention or destruction policy to a system in which various types of employees have stored numerous files on a number of computers, including personal computing devices (PDAs), desktop computers, servers, or the like. Moreover, existing systems do not effectively manage individual data records that are embedded in other stored files, such as a specific data field in a word document, a single cell in an Excel® spreadsheet, a specific attachment linked to an email, or the like. Given the complexity of most existing computer systems, there has been a long-standing need for a system and method that can efficiently implement a unified record management policy over a plurality of existing computers having many different systems and computing platforms. In view of this problem, with the increased focus of evidence discovery on data stored on computer systems, there also exists a continuing need for a system that offers a proactive approach that allows a business entity to properly collect and manage data records to reduce the exposure of discovery conflicts in future litigation.

Based on the above-described deficiencies associated with existing systems, there is a need for a system and method that can efficiently manage, retrieve, process, and store data stored in a number of networked computers. There also exists a need for a data management system that can efficiently determine the availability of resources associated with the resources of a distributed data processing system. In addition, there exists a need for a system that can efficiently implement a unified record management policy over a plurality of networks having many different operating platforms.

SUMMARY OF THE INVENTION

In view of the forgoing, the present invention provides a system and method for processing data on a plurality of distributed computing devices. More specifically, in accordance with one aspect of the present invention, the system and method prioritize and assign computing tasks over a network of distributed computing devices. In one embodiment, in the plurality of networked computers, each computer communicates the availability of its computing resources to a server.

The server then determines if the resources available on the networked computers match at least one computing task stored in an agent for execution. If the server determines that an available resource matches at least one process stored in an agent for execution, the agent containing the matching computing task is then assigned to the available computer resource. The present invention provides improved efficiency in the execution of distributed computing tasks by allowing the distributed computers to communicate the availability of their computing resources.

In accordance with one aspect of the present invention, the system and method utilize mobile agents to distribute the computing tasks to be carried out in the network of distributed computers. A mobile agent is software, which is able to transport itself between a number of different locations within a computer network. By the use of code stored in the mobile agents, the mobile agents execute at a remote device within the computer network. This design provides an efficient way to assign a number of different tasks to individual computers, each having different computing resources. The system and method also provide a mechanism for configuring and generating mobile agents and other systems for storing data generated from each mobile agent.

In accordance with another aspect of the present invention, the system and method provide an improved, knowledge-based system to manage and process electronic evidence data. In one embodiment, a system provides a management tool that allows a user to configure data processing tasks by the use of a graphical user interface having a set of expressions that model tasks related to data processing. In this embodiment, the graphical user interface formed in accordance with the present invention includes a set of expressions, in which each expression graphically represents a process or a portion of a process. The set of expressions, which can be in the form of a plurality of icons, can model data objects or functions of a data management system. The graphical user interface is configured to allow a user to link and configure a number of data or function objects to perform a specific task over a distributed network of computers. The graphical user interface is also configured to illustrate the interrelationships between the modeled objects. The graphical user interface allows for the receipt of attributes related to objects by the use of graphical models or pop-up menus.

In accordance with one specific aspect of the present invention, the system obtains a user-defined set of expressions, which defines processes to be performed on electronic evidence data. The user then configures the set of expressions to define a task to be performed on electronic evidence data. The system then generates executable code in at least one mobile agent, based on the user-defined expressions. The mobile agent is then communicated to a number of resource computers for execution.

In one specific embodiment, a method of the present invention comprises a step of generating and displaying a graphical user interface configured to display a set of expressions that represent objects of a system, wherein the set of expressions provides access to properties associated with each object, wherein the set of expressions defines properties associated with one or more computer implemented tasks, or a portion thereof, that process electronic evidence, wherein the graphical user interface is configured to graphically link objects to illustrate the process flow of a user configured process. The method also comprises the step of receiving a specific set of expressions representative of a plurality of computer implemented functions that are configured to perform a set of tasks over a distributed network of computers; generating a mobile agent having executable code configured in accordance to the user defined set of expressions; communicating the mobile agent to at least one resource computer for execution of the tasks defined in the agent; and executing one or more tasks defined in the executable code.

In yet another aspect, the present invention provides an improved mechanism for configuring a data management system that implements a unified record management policy. More specifically, the present invention provides a system and method that allows at least one computing device to implement a unified record management policy over a number of computers having different hardware and software platforms. In one illustrative example, one embodiment of the present invention allows one or more computing agents to periodically examine records stored on a number of different computers. If it is determined that the records have been stored on a computer for a predetermined period of time, the records may be deleted, purged, or transferred to a particular storage device. The various embodiments of the present invention provide a mechanism that allows a business entity to take a proactive approach in record management procedures, which may reduce exposure of a business entity in litigation. In addition, along with other benefits, this aspect of the present invention provides an efficient mechanism for managing records to preserve storage space of storage devices on a distributed system. For purposes of illustrating the present invention, a record may be any data segment that is defined by a unit of information. For instance, a record may be an entire email, a group of emails, a spread sheet, a single cell of a spread sheet, a data field in a text document, groups of documents, entire databases, a specific data bit, a data byte, or any other unit of information that may be defined by one or more parameters.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention provides a system and method for processing data on a plurality of distributed computing devices. More specifically, in accordance with one aspect of the present invention, a system and method prioritize and assign computing tasks that are distributed over a network of computing devices. In one embodiment, the plurality of networked computers each computer communicates the availability of its computing resources to a server. The server then determines if the resources available on the networked computers match at least one computing task stored in the server for execution. If the server determines that the available resources match at least one process stored for execution, the matching computing task is then assigned to the available computer. The present invention provides improved efficiency in distributed computing tasks by allowing the distributed computers to communicate the availability of their computing resources. The present invention also provides an improved method for configuring a record management system that can efficiently implement a unified record management policy over a plurality of distributed computing devices.

The following description of the present invention first provides an overview of one suitable computing environment in which the invention may be implemented. The description then provides a general overview of several working examples of the system and method of the present invention. The description also provides a summary of applications of the present invention, including the application of processing electronic evidence data.

Figure 1:
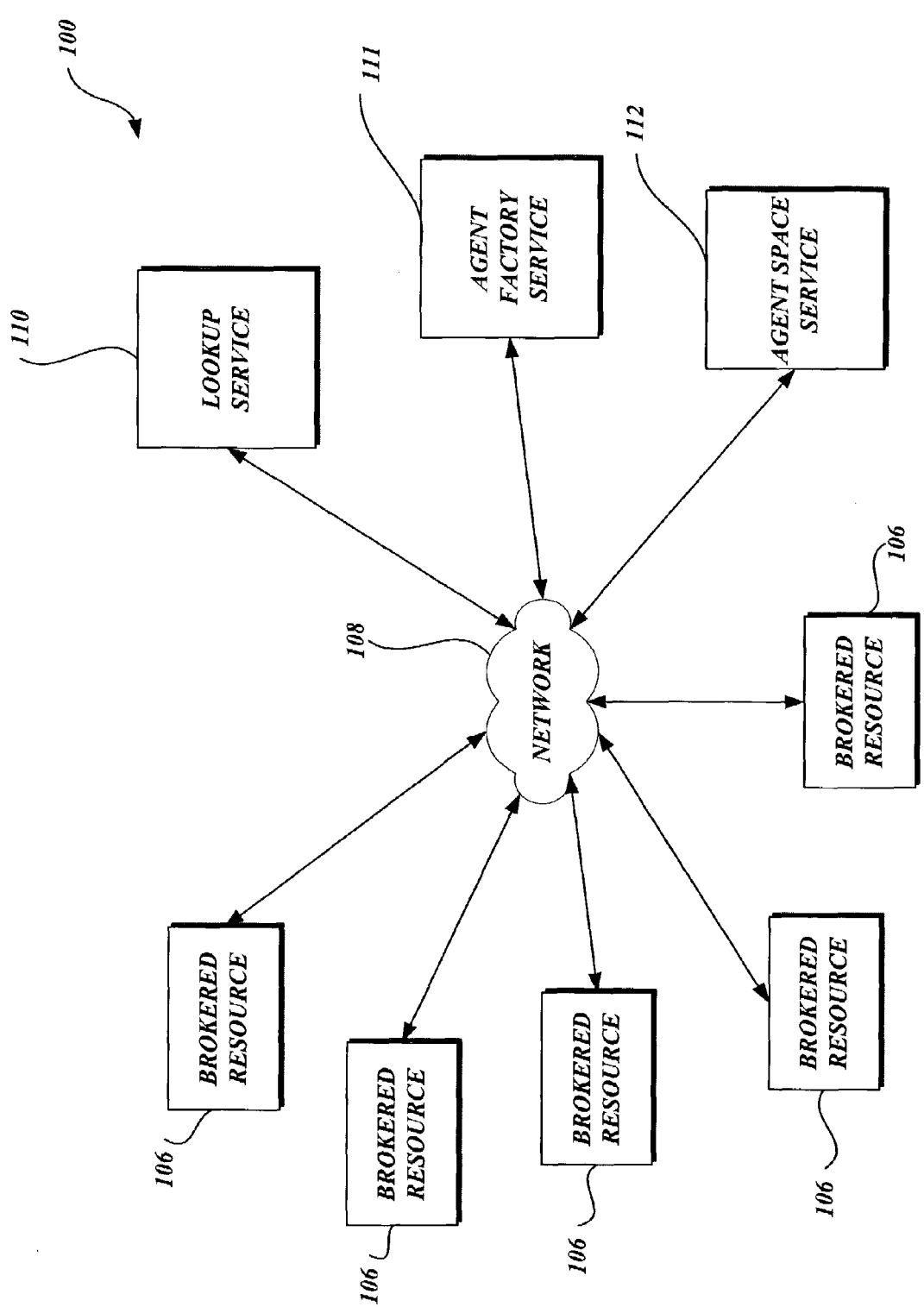
FIG. 1 is a block diagram of a plurality of networked computing devices for managing distributed data processes, all of which are formed in accordance with the present invention.

Referring to FIG. 1, the following description is intended to provide an exemplary overview of one suitable computing environment in which the invention may be implemented. Generally described, the computing environment may comprise a plurality of resource computers 106, a lookup server 110, an agent factory server 111, and an agent space server 112. For illustrative purposes, the function of each server will be described herein as a "service," which also describes the function of each server. Each computing device depicted in FIG. 1 is configured to electronically communicate via a network 108, such as the Internet. Details of the resource computers 106 are described in greater detail below with respect to FIG. 2. The servers 110-112 are described in greater detail below with respect to FIGS. 3-5. It should be appreciated that the computing environment shown in FIG. 1 is provided for illustrative purpose only. It should also be appreciated by one of ordinary skill in the art that the present invention may be implemented on other suitable computing environments having a different number of computing devices and/or different server configurations. In addition, the environment utilized for implementing the present invention may be configured on an Intranet, thereby limiting the computing devices to a closed system.

As known to one of ordinary skill in the art, the term "network" refers to a collection of computers, networks, and routers that use the Internet protocol ("IP") to communicate with one another. As known to one having ordinary skill in the art, the network 108 generally comprises a plurality of local area networks ("LANs") and wide-area networks ("WANs") that are interconnected by routers. Routers are special purpose computers used to interface one LAN or WAN to another. The communication links between each computing device depicted in FIG. 1, which may be via hardwire or wireless communication, can include any protocol and hardware configuration suitable for communicating the electronic data described below.

Figure 2:
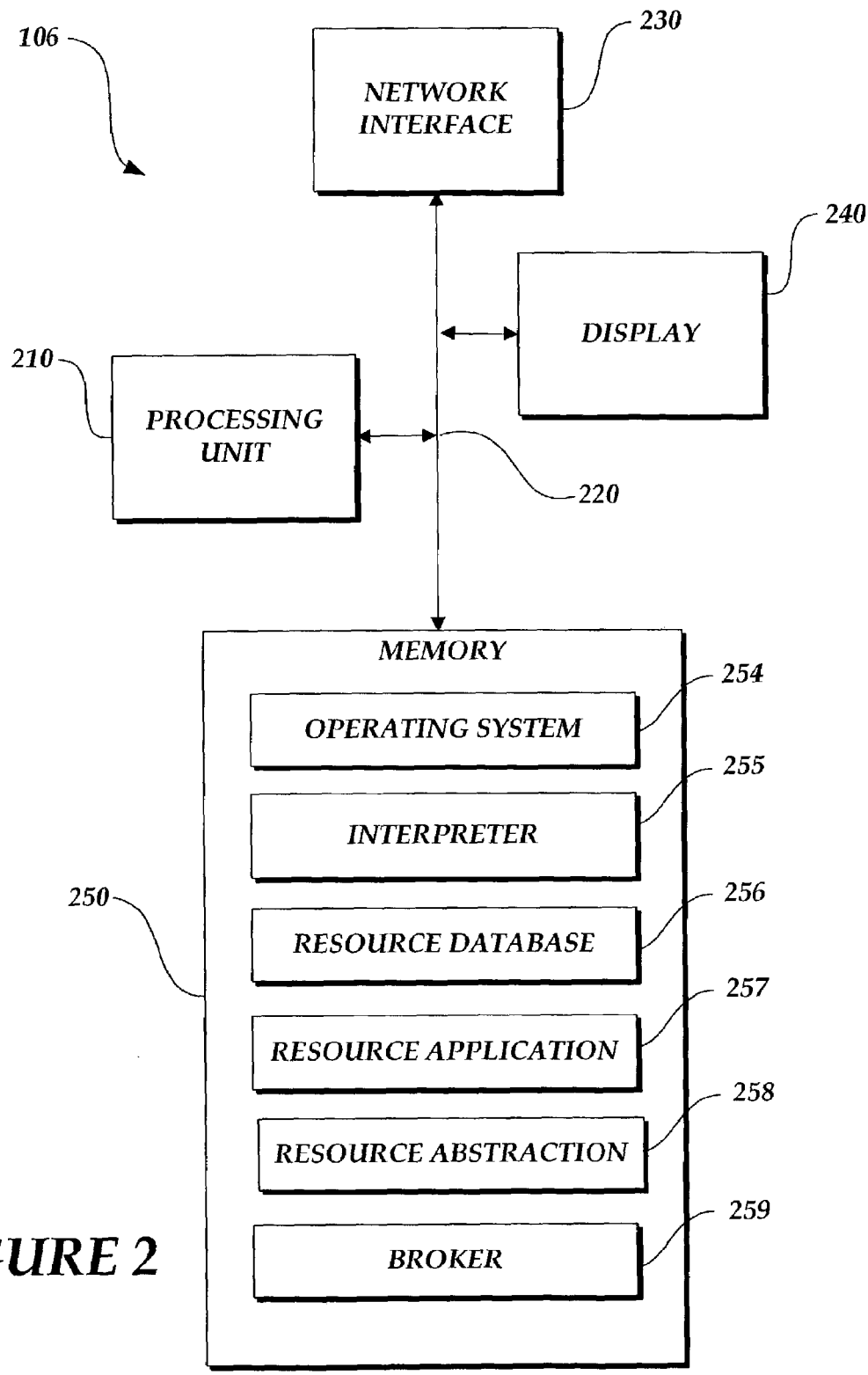
FIG. 2 is a block diagram illustrating a suitable architecture of a brokered resource computer utilized in an actual embodiment of the present invention.

Referring now to FIG. 2, an illustrative computer architecture for implementing a brokered resource computer 106 (also referred to as a resource computer) in accordance with one aspect of the present invention will be described. Those of ordinary skill in the art will appreciate that the resource computer 106 may include many more components than those shown in FIG. 2. However, it is not necessary that all of these generally conventional components be shown in order to disclose an illustrative embodiment for practicing the present invention. As shown in FIG. 2, the resource computer 106 includes a network interface 230 for connecting to the network 108. Those of ordinary skill in the art will appreciate that the network interface 230 includes the necessary circuitry for such a connection, and may be constructed for use with the TCP/IP protocol.

The resource computer 106 also includes a processing unit 210, a display 240, and a memory 250. The memory 250 generally comprises a random access memory ("RAM"), a read-only memory ("ROM"), and a permanent mass storage device, such as a disk drive. The memory 250 stores the program code necessary for operating the resource computer 106 and for providing a user interface on the display 240. In addition, the memory 250 stores other software components, such as an operating system 254, an interpreter 255, a resource database 256, a resource application 257, a resource abstraction 258, and a broker application 259.

As described in more detail below, the interpreter 255 is configured to receive and interpret the configured program code embedded in mobile agents received by each resource computer 106. Also described in more detail below, the program code embedded in each mobile agent may be executed by the resource application 257, which may function to extract or store data in the resource database 256. The resource abstraction 258 represents an object model that functions as a connector between the broker 259, mobile agent logic, and the resource applications 257 application-programming interface (API). The broker 259 is a software application that functions as an intermediary between the mobile agent and the resource application 257. The broker 259 allows the resource computer 106 to simultaneously generate a large number of instances of a resource at one time. For illustrative purposes, sample programming code associated with the functions of the broker 259 is provided in Appendix D. The interpreter 255 functions as an interpretive layer between the operating system 254 and the other software objects 256-259. As can be appreciated by one of ordinary skill in the art, the interpreter 255 may be implemented by a commercially available software suite, such as .NET Framework, Java, or the like. It will be appreciated that these software components may be loaded from a computer-readable medium into the memory 250 of the resource computer 106 using a drive mechanism associated with the computer-readable medium, such as a floppy, tape, or CD-ROM drive, or via the network interface 230.

Although an illustrative resource computer 106 has been described that generally conforms to a conventional general purpose computing device, those of ordinary skill in the art will appreciate that the resource computer 106 may comprise any number of devices capable of communicating with a network or a set of servers, such as the servers 110-114 depicted in FIG. 1. For example, the resource computer 106 may be another server, a two-way pager, a cellular phone, a personal data assistance ("PDA"), or the like.

Figure 3:
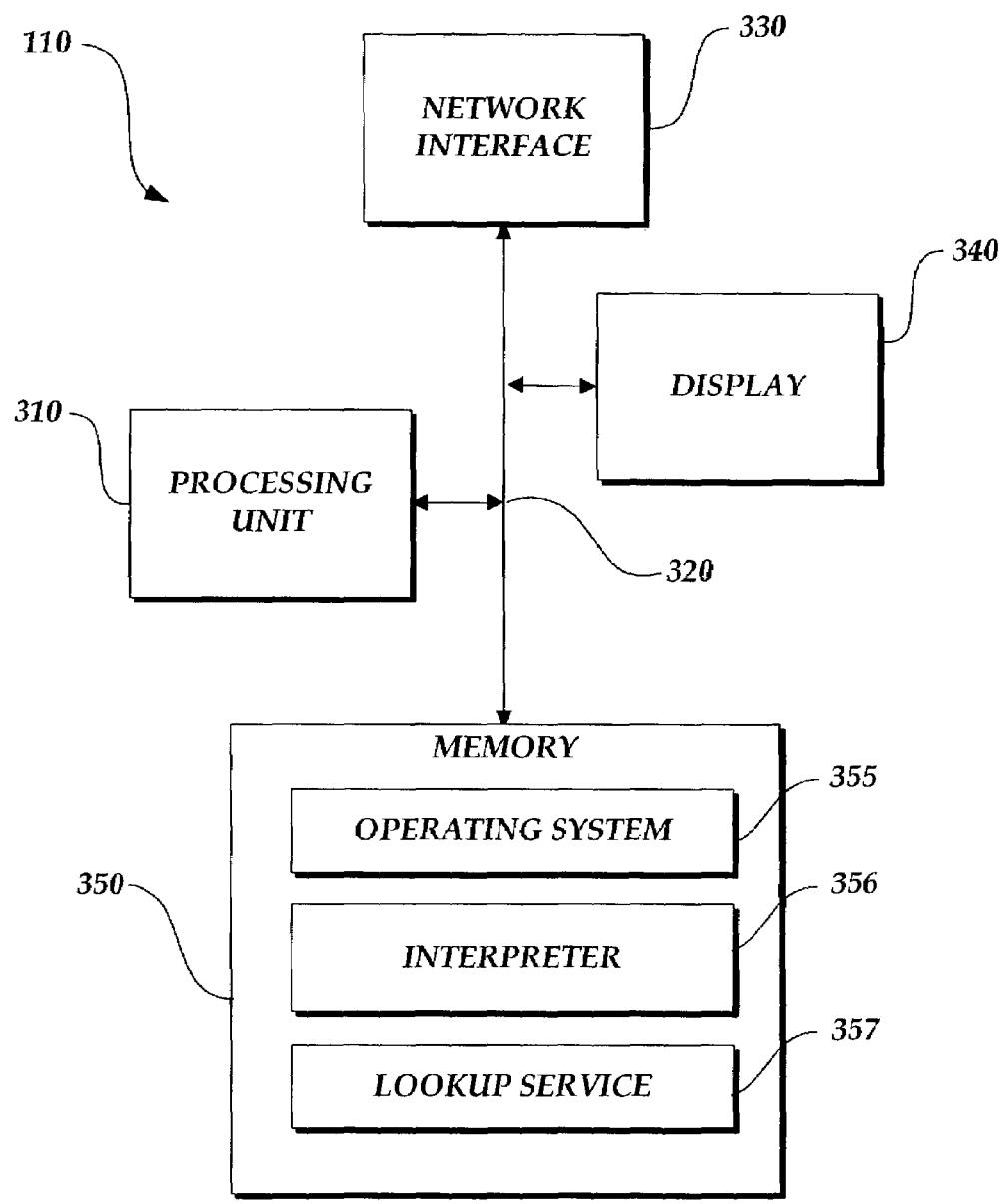
FIG. 3 is a block diagram illustrating a suitable server architecture utilized to implement a look-up service, formed in accordance with the present invention.

FIG. 3 is a block diagram illustrating a suitable server architecture utilized to implement a lookup server 110, which is also referred to as a lookup service. In general, the server 110 depicted in FIG. 1 has the general architecture of the example computing device illustrated in FIG. 2. For instance, the lookup server 110 may be configured with a processing unit 310, a bus 320, a display 340, a network interface 330, and a memory 350. The memory 350 generally comprises a random access memory ("RAM"), a read-only memory ("ROM"), and a permanent mass storage device, such as a disk drive. The memory 350 stores the program code necessary for operating the servers 110-112. In addition, the memory 250 stores other software components, such as an operating system 355, an interpreter 356, a lookup service 357, and other existing software components necessary to carry out the methods described herein. This example architecture is provided for illustrative purposes and is not to interpreted as limiting disclosure.

As described in more detail below with reference to FIG. 7, the lookup service 357 of the lookup server 110 functions as a general directory, which provides data that helps the direction and assignment mobile agents to various brokered resources. The lookup service maintains a list of all brokered and non-brokered services of the system. For illustrative purposes, "brokered services" include the services of a resource computer 106 configured to receive and execute code stored in a mobile agent. A non-brokered service relates to services that assist the transfer or management of the mobile agents, such as the lookup services, agent space services, agent factory services, transaction services, gateway services, etc. Referring again to FIG. 3, it can be appreciated by one of ordinary skill in the art that the lookup server 110 comprises an interpreter 356 which functions as the interpretive layer between the operating system and the code stored in the mobile agents.

Figure 4:
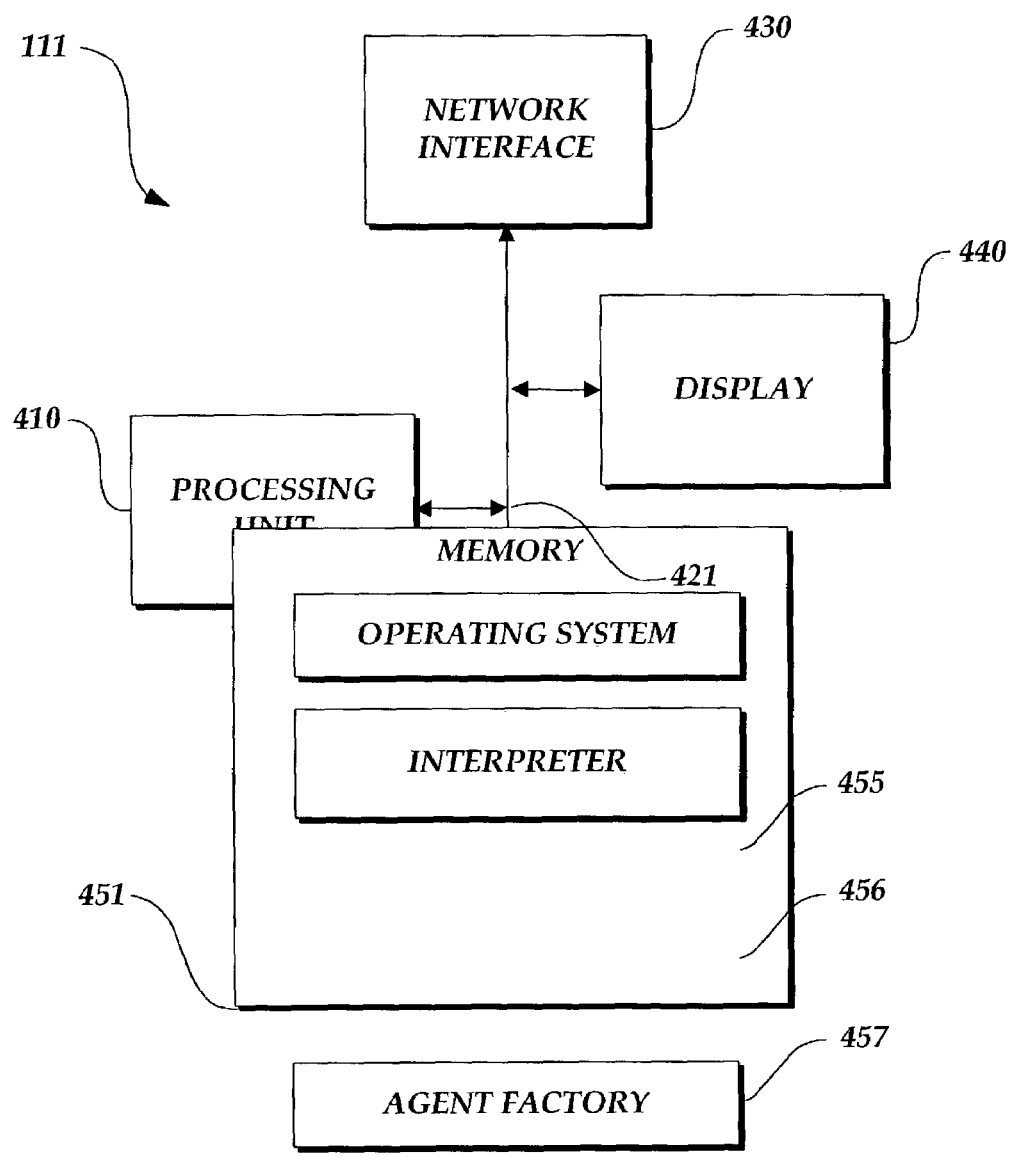
FIG. 4 is a block diagram illustrating a suitable server architecture utilized to implement an agent factory service, formed in accordance with the present invention.

FIG. 4 is a block diagram illustrating a suitable server architecture utilized to implement an agent factory server 111, also referred to as an agent factory service. In general, the agent factory server 111 comprises the general architecture of the aforementioned example computing devices. For instance, the agent factory server 111 comprises a processing unit 410, a network interface 430, a display 440, and a bus 421 for connecting the components to a memory 451. The memory stores code for an operating system 455, an interpreter 456, and an agent factory service 457. As described in more detail below, the agent factory service 457 comprises the necessary code for generating one or more mobile agents configured for distribution and execution over a network of computing devices having brokered resources.

Figure 5:
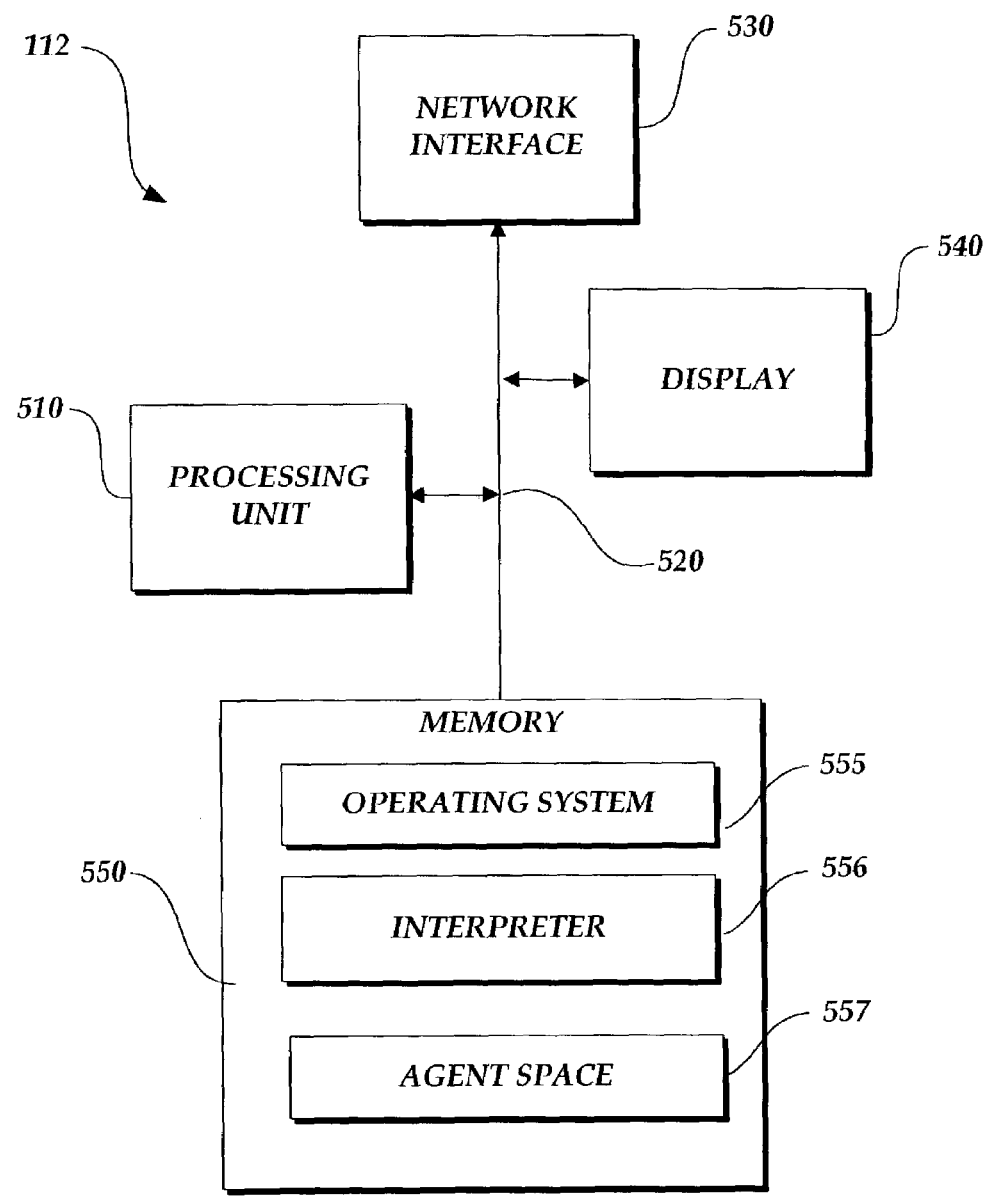
FIG. 5 is a block diagram illustrating a suitable server architecture utilized to implement an agent space service, formed in accordance with the present invention.

FIG. 5 is a block diagram illustrating a suitable server architecture utilized to implement an agent space server 112, also referred to as an agent space service. In general, the agent space server 112 comprises the general architecture of the aforementioned example computing device. For instance, the agent space server 112 comprises a processing unit 510, a network interface 530, a display 540, and a bus 520 for connecting the components to a memory 550. The memory stores code for an operating system 555, an interpreter 556, and an agent space service program 557. As described in more detail below, the agent space service 557 comprises the necessary code for storing one or more mobile agents and code for distributing mobile agents over a network of computing devices having agent interpreters or brokered resources. As described in more detail below with reference to FIG. 7, in one embodiment, the agent space service identifies and matches mobile agents with associated brokered services by the use of a service description. Example programming code associated with the service description function is shown in Appendix B.

The following section describes one embodiment of the present invention that utilizes mobile agents to execute a series of user-defined tasks that are embedded in each mobile agent. More specifically, the following section of the detailed description provides an overview of a mobile agent system, followed by an illustrated example of a mobile agent configured to execute a series of tasks to process e-mail records having compressed files. The following example is provided to illustrate one working example of the present invention, and is not to be construed to be a limiting disclosure.

Although the various non-brokered resources, such as the agent factory server 111, lookup server 110, agent space server 112, are depicted in FIG. 1 as three separate computing devices, it can be appreciated by one of ordinary skill in the art that any one of these services may reside on a single machine, two machines, or any other number of computers so long as the software is configured to execute the various methods described herein.

Referring again to FIG. 1, in one embodiment, the present invention provides a system 100 having an agent space service 112. In this embodiment, the agent space service 112 functions as a monitoring tool for storing and managing mobile agents. The system 100 further comprises an agent factory service 111 that functions as an administration tool for allowing users to configure and generate mobile agents. The system 100 also comprises a lookup service 110 that functions as a registration tool for registering each brokered resource 106 and non-brokered service.

During operation, the mobile agents of the system 100 are configured by a user operating the agent factory service 111. Once the mobile agents are generated, they are registered with the lookup service and transferred to an agent space service 112 for storage and distribution. To initiate the execution of code stored in a mobile agent, the brokered resources 106 communicate data with the agent space service 112 to indicate the availability of computing resources on at least one brokered resource 106. Once the agent space service 112 determines that the parameters of an available computing resource matches the requirements of an unexecuted task configured in a stored mobile agent, the agent space service 112 sends the mobile agent to the brokered resource 106 having available computing resources. Once the task is executed at the broker resource 106, the mobile agent is returned to the agent space service 112. If the mobile agent contains multiple tasks that must be executed on a different brokered resource, the mobile agent is then communicated to another brokered resource 106 once a resource computer indicates that it contains available computing resources that match the unexecuted tasks stored in the mobile agent.

For illustrative purposes, the term "task" refers to a logical unit of computer functions that is made up of one or more work units, transactions, processes or instructions that can be executed by a software application or software component. A task can also be configured software that can implement a method to complete an overall goal or motivation. For example, task can serve as an interpreter or operating system that supports the operation of the code stored in a mobile agent. As can be appreciated, a task can be executed by a single computer or a plurality of computers, and there are cases in which a plurality of tasks can execute on one computer. As also can be appreciated, tools for providing an environment in which mobile agents can operate are commercially available from a number of different vendors including: IBM® (product is Aglet Work Bench™), Sun Microsystems® (Java™), Fujitsu® (Kafka™), General Magic® (Odyssey™), ObjectSpace® (Voyager™), and Mitsubishi® (Concordia™). As can be appreciated, the present invention is not restricted to the use of any particular one of these tools.

Figure 6:
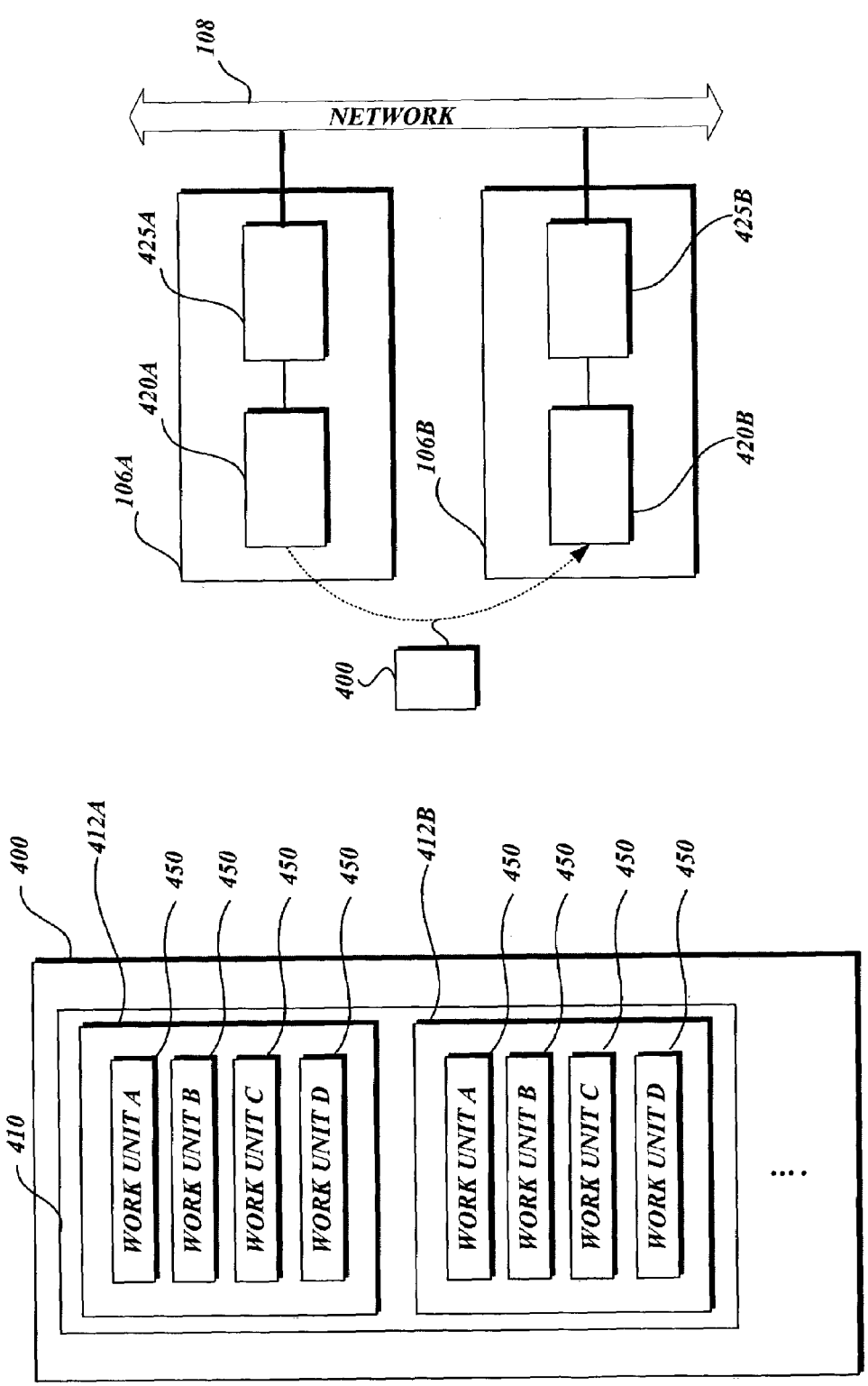
FIG. 6A is a block diagram of a mobile agent formed in accordance with the present invention.
FIG. 6B is a block diagram illustrating internal components of two resource computers and an illustration of an agent migrating from a first resource computer to a second resource computer.

Referring now to FIGS. 6A and 6B, one embodiment of a mobile agent 400 formed in accordance with the present invention is shown and described. As can be appreciated, a mobile agent, also referred to as a robot or wanderer in a network, is a program that is equipped with program code 410 configured to move between and execute on distributed computers, such as resource computers 106A and 106B. The program code 410 defines a sequence of work units 450 ordered to perform a user defined task. In the example of FIG. 6A, the mobile agent 400 contains a first transaction set 412A and a second transaction set 412B. This example illustrates multiple sections of code to execute on different computers 106A and 106B: the first transaction set 412A is configured to execute on the first resource computer 106A, and the second transaction set 412B is configured to execute on the second resource computer 106B.

As can be appreciated by one of ordinary skill in the art, the work units 450 defined in each transaction set 412A and 412B may be configured to carry out any number of tasks on a computing device. For instance, Work Unit A may be configured to search through a file system for files containing a particular text string, Work Unit B may be configured to translate the retrieved text documents, etc. The Work Units 450 of the second transaction set 412B may be configured to carry out a different set of tasks. For instance, Work Unit A of the second transaction set 412B may be configured to extract data from the agent 400, Work Unit B may be configured to transfer the extracted data to a compression program, etc. For illustrative purposes, programming code for an example mobile agent is provided. Appendix A represents example code for a mobile agent, Appendix C represents example code associated with a transaction set 412A or 412B, and Appendix E represents example code associated with the work units utilized by the mobile agents.

In other examples, the program code 410 may comprise one or more transaction sets to implement a unified document management policy on a plurality of networked computers. In this example, the mobile agent 400 may comprise code 410 to instruct the mobile agent 400 to transfer to a number of networked computing devices and provide specific instructions with respect to data management. In one specific example, the mobile agent 400 may be instructed to travel to each computing device of a network and search for documents that have been stored for a predetermined time period. The agent may then select a number of documents that have been stored on one or more computing devices for a predetermined time period. The system may then execute a number of functions to transfer, delete, or purge the selected documents. The aforementioned features may be beneficial to companies that need to implement a document policy that routinely deletes or retains particular documents. Although this example utilizes the selection of documents based on a date, the present invention may select documents by the use of any property of a document, including a file name, attribute, format type, or the like. The program codes 410 may also comprise a service description that defines the execution requirements of the work units 450 stored in the program code 410. As described in more detail below with reference to FIG. 7, the service descriptions in each mobile agent may be used to match various mobile agents with the service descriptions of one or more brokered resources to facilitate the distribution and assignments of the mobile agents.

As shown in FIG. 6B, the mobile agent 400 may be transparently communicated between the first and second resource computer 106A and 106B to complete the tasks defined in the program code 410. To facilitate the execution and transfer of the mobile agent over the network 108, the first and second resource computers 106A and 106B comprise a number of software components. As described above, the resource computers 106A and 106B may comprise the necessary software components to facilitate the transfer and execution of the program code stored in the mobile agents. For instance, the resource computers 106A and 106B may comprise an agent platform 420(A-B) and an agent interpreter 425(A-B). The agent platform 420(A-B) provides each resource computer with executable computer language and libraries to allow for the execution of the program code in each mobile agent. The agent interpreter 425(A-B) allows each resource computer to receive and store the code and other data stored in the mobile agent. Those of ordinary skill in the art will appreciate that a resource computer may include many more software components to facilitate the transfer and execution of code in a mobile agent; however, it is not necessary that all of these generally conventional components be shown in order to disclose an illustrative embodiment for practicing the present invention. For instance, a resource computer may comprise an agent manager for controlling the receipt and transmission of mobile agent data.

As can be appreciated by one of ordinary skill in the art, each mobile agent 400 may include data, code, library information, destination data, and other information. The data portion includes internal state information associated with the mobile agent 400. The code and library information provides executable code associated with operation of the agent. The destination data specifies destinations for the mobile agent 400. The example mobile agent configuration is provided for illustrative purposes; thus, the present invention is not limited to this example configuration of FIGS. 6A and 6B.

Figure 7:
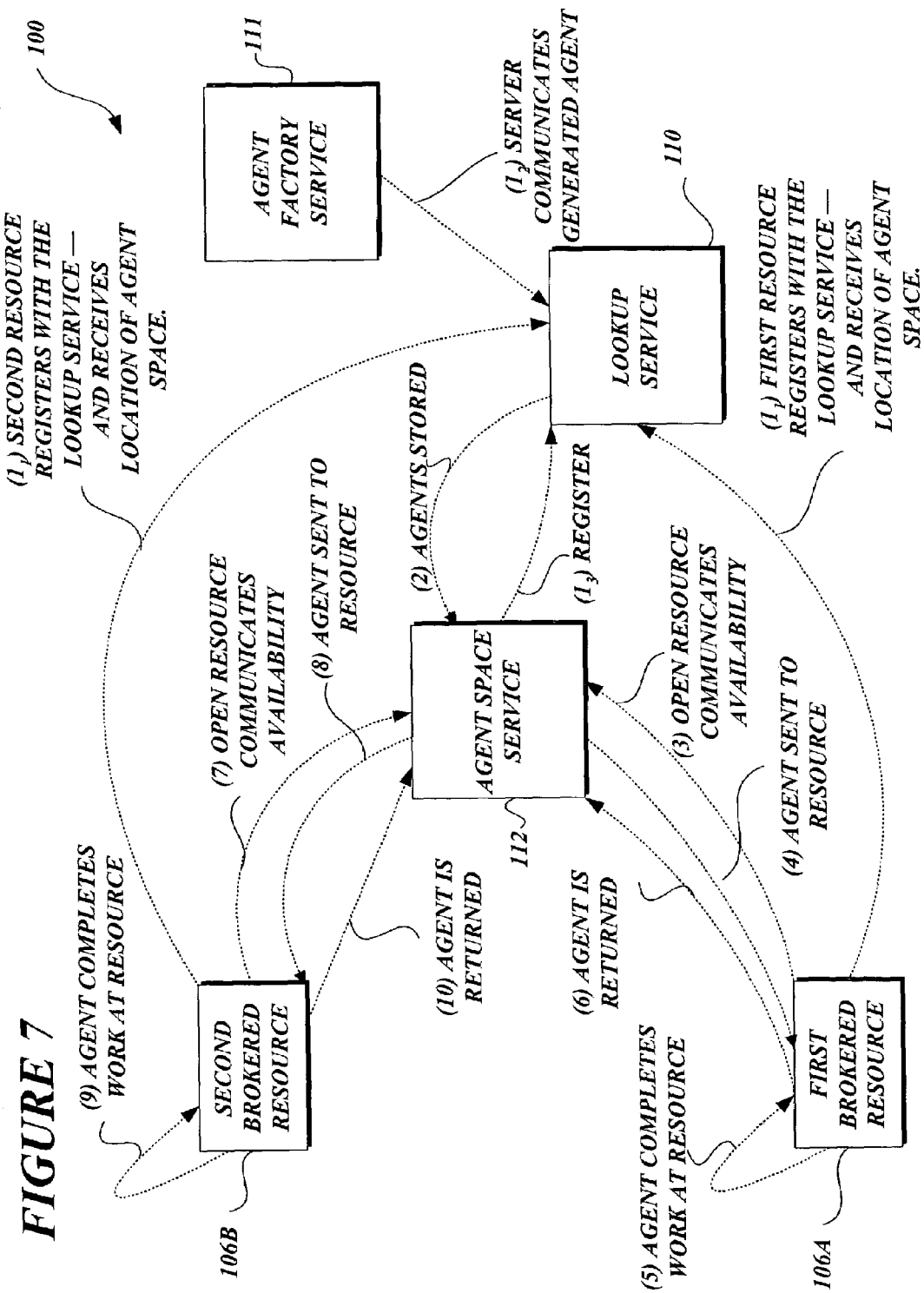
FIG. 7 is a block diagram illustrating the flow of a data processing method formed in accordance with the present invention.

Referring now to FIG. 7, in conjunction with the representative drawings of FIGS. 6A and 6B, a working example of the above-described system 100 is shown and described. In general, these examples illustrate a process whereby a mobile agent is used to collect compressed data records in the first computer resource 106A, process the compressed data records in the second computer 106B, and the transmit the processed data records to a common records server for storage. For purposes of illustrating the present invention, a record may be any data segment that is defined by a unit of information. For instance, a record may be an entire email, a group of emails, a spread sheet, a single cell of a spread sheet, a data field in a text document, groups of documents, entire databases, a specific data bit, a data byte, or any other unit of information that may be defined by one or more parameters.

To initiate the execution of the desired tasks, a user may create a mobile agent on a computing device, such as the agent factory service 111, by the use of a mobile agent management tool. To facilitate the configuration of a mobile agent, the present invention provides a mobile agent management tool configured to generate a graphical user interface having a set of expressions that model the tasks to be carried out by the system.

Figure 8:
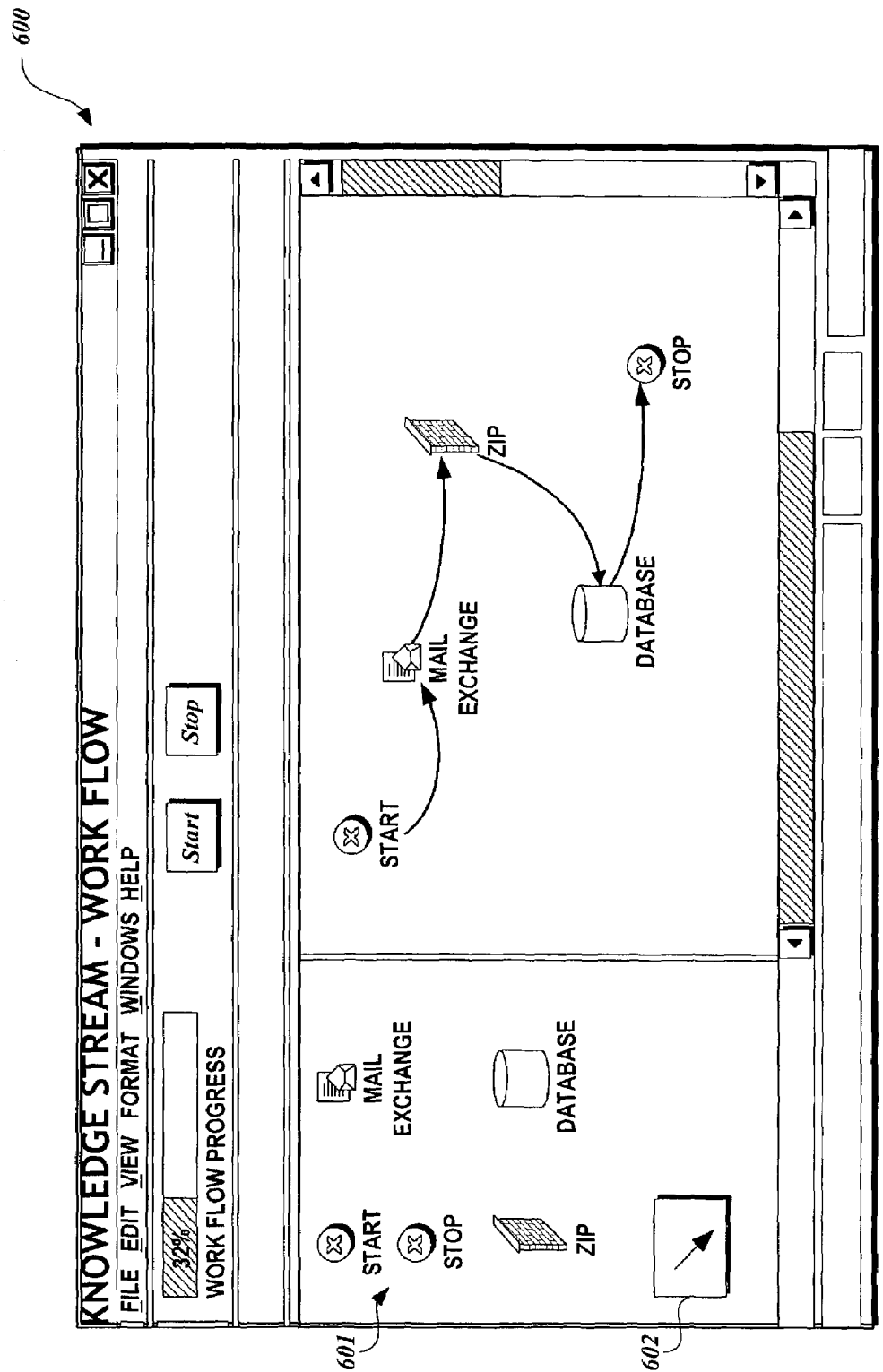
FIG. 8 illustrates a graphical user interface for configuring mobile agents in accordance with the present invention.

FIG. 8 illustrates one example of a graphical user interface for configuring mobile agents in accordance with the present invention. In one embodiment, the graphical user interface formed in accordance with the present invention includes a set of expressions 601, each of which graphically represents a process, a portion of a process, or an object. In one embodiment, icons are used to represent the resources that are provided on distributed computers. For example, the graphical user interface may display a set of expressions 601 that represent an electronic mail resource ("mail exchange"), a data compression resource ("Zip"), and a storage database resource ("database"). The graphical user interface 600 also displays other icons to represent a start and stop point of a workflow process. The graphical user interface also comprises a section that allows the user to select icons from the set of expressions 601 and arrange the icons in accordance to a desired workflow process.

The graphical user interface 600 also provides at least one linking object 602 that allows the user to graphically link the arranged icons to confirm the user's desired process and the path in which data may be transferred. FIG. 8 illustrates one specific example where a user has arranged a workflow process, which starts with a mail exchange service to retrieve specific data records from a particular mail server. The workflow process then continues with another resource where the data retrieved from the mail resource is sent to the data compression resource to decode (decompress) the compressed data records. As indicated by the database icon, the workflow process then concludes with a process for sending processed (decompressed) data records to a database resource for storage. As shown in this example, the graphical user interface 600 is configured to illustrate the interrelationships between the modeled resources and objects, as well as provide a graphic for displaying the progress of a task as the agent moves through the system.

The graphical user interface 600 may be configured with additional windows or pop-up menus that allow a user to enter specific parameters for each object. For instance, a pop-up menu may be displayed when a user selects the mail exchange icon. The pop-up menu may then prompt the user to enter specific data regarding the mail exchange resource, such as a specific mail server, search parameters used for retrieving selected mail records, and other like information. Other data retrieval menus may be provided for other objects, such as the compression resource and the database resource.

Although the examples disclosed herein utilize applications and systems such as e-mail services, compression services, and storage resources, it can be appreciated by one of ordinary skill in the art, that the embodiments of the present invention are not limited to such functions. For instance, mobile agents may be utilized to implement a unified record management policy over a plurality of computers to manage the storage of data records. In one example, the mobile agents may be utilized to implement a record retention policy that instructs a number of different databases, applications, and/or systems to periodically archive, purge, or transfer data records. Different data records can be processed, deleted, or transferred depending on various search criteria, such as the time a record has been stored in a system, the type of text contained in a record, and/or any other information that may distinguish a particular data record.

By the use of the system and method of the present invention, data records may also be processed on a periodic basis. For instance, the system may be configured to simultaneously purge specific emails in one system and archive word processing documents in another system on an hourly, daily, weekly, or yearly time frame. As can be appreciated by one of ordinary skill in the art, the unified record management policy configured in accordance to the present invention may be configured to accommodate any other desired schedule.

Once all of the user-configured process parameters are received by the graphical user interface 600, a server, such as the agent factory service 111, generates a mobile agent according to the parameters received by the graphical user interface 600. In one embodiment, the program receiving user data from the graphical user interface 600 generates a blueprint that can be read by a server to generate a mobile agent. One example of a blueprint is shown in Appendix F. As can be appreciated by one of ordinary skill in the art, the mobile agent may be configured by the use of a number of different tools that may yield a variety of mobile agent data structures. In this example, provided for illustrative purposes, the mobile agent is configured to contain program code configured in a manner similar to the format shown in FIG. 6A. As noted above, the first instruction set 412A stored in the mobile agent 400 is configured to execute on a resource computer having resources that match the coded transactions in the agent.

Returning to FIG. 7, one embodiment of a data processing method utilizing the above-configured agent is shown and described. The process flow illustrated in FIG. 7, among other things, accomplishes two goals: (1) executes the program code stored in the mobile agents, and (2) efficiently prioritizes and distributes the workload processes defined in the mobile agents. As described above, one aspect of the present invention is to prioritize and assign computing tasks over a distributed network of resource computers to optimize the efficiency of the system. Generally described, the system assigns tasks stored in the mobile agents according to the availability of resources of a networked resource computer. Converse to a system where servers "push" the mobile agents to a particular computer for processing, the resource computers of the system each communicate the availability of its computing resources to a server. The server then determines if one computing task stored in a mobile agent matches the parameters of resources that are available in one or more resource computers. If the server determines that the tasks defined in the mobile agent match the available resources, the agent is transmitted to the available resource for execution.

Before the mobile agent is communicated to a brokered resource 106 for execution, as shown in the initialization steps $1_1$, the brokered resources register with the lookup service 110. In this part of the process, the lookup service 110 receives information indicating the location of each brokered service, and various parameters describing the function and capabilities of the resource applications located at each brokered resource computer. As described in more detail below, one embodiment of the present invention utilizes data describing execution requirements, such as a service description, of a mobile agent to match the mobile agent with an appropriate brokered resource computer. For example, the first brokered resource 106A may advertise that it may perform various functions related to e-mail storage and retrieval tasks. At the same time, the second brokered resource 106B may advertise that it is configured to compress and decompress data files.

As shown in Step $1_3$, one or more agent space services 112 may register with the lookup service 110. Similar to the registration of the brokered resources (Step $1_1$), the registration of the agent space service 112 may involve the transfer of data that identifies the location and function of the agent space service 112. In one embodiment of the present invention, as shown in Step $1_2$, the agent factory service 111 may send one or more data queries to the lookup service 110 to retrieve information that describes the location and the functions of the brokered resources and agent space services. This information retrieved in the initialization Step $1_2$ may be used to generate one or more mobile agents configured to be stored at a specific agent space service and/or execute at a specific brokered resource. In one embodiment, the lookup service 110 may provide data describing a service and/or a resource (106 and 110-112), such as a computer IP address, port number, and service descriptions available on each computing device.

Once the mobile agent 400 is generated, as shown in Step 2, the mobile agent 400 is communicated to the agent space service 112 for storage. As can be appreciated by one of ordinary skill in the art, the agent space service 112 may be configured to store a plurality of mobile agents. Thus, the agent factory service 111 and lookup service 110 may send a number of individual agents to the agent space service 112 for storage, regardless of the number of mobile agents that are deployed to a brokered 106 computer for execution.

The mobile agents stored in the agent space 112 may be assigned to the resource by a number of methods. In one embodiment, each mobile agent may be assigned to a specific resource computer by "pushing" each mobile agent to a resource computer according to the tasks and services descriptions stored in the program code of the mobile agent. This method may be utilized as one embodiment of the present invention; however, it can be appreciated that a method of pushing agents to a particular resource computer may create a backlog of mobile agents in one or more resource computers, thereby creating a possible restriction in the workflow process of a number of mobile agents.

In another embodiment, the present invention may utilize above-mentioned prioritization schema that allows each resource computer to communicate the availability of its resources to the agent space service 112. This embodiment allows the mobile agents to reside in the agent space until a suitable resource computer becomes available to receive and process the tasks of a particular mobile agent. This prioritization schema is shown in steps 3-10 of the flow diagram of FIG. 7. In this embodiment, the resource computers 106 function as brokered resources 106A and 106B that communicate the availability of a computing resource, a function which ultimately controls the execution priority of the mobile agents. In this description of one working example, the resource computers will be referred to as a first brokered resource 106A and a second brokered resource 106B.

To initiate the execution of the Work Units defined in the mobile agent 400, a first resource computer 106A communicates the availability of its resources to the agent space 112. This process is shown in Step 3. In one embodiment, the open resource communicates its availability by transmitting an "empty" mobile agent to the agent space service 112. For illustrative purposes, an empty agent may contain a listing of the available resources of a particular computer, and may identify certain parameters such as a group name, server name, a service description, computer identifier, or the like. As can be appreciated, the method of the present invention is not limited to an embodiment utilizing empty mobile agents, as each resource computer may communicate any message, data package, or signal to indicate the availability of its resources.

When the agent space service 112 receives the empty agent, the agent space service 112 then determines if the resources defined in the empty agent match the requirements of the tasks defined in a stored mobile agent. If the agent space 112 determines that the empty agent does not match the requirements of the tasks defined in a mobile agent, the empty agent resides in a memory unit of the agent space 112 to indicate that the resources defined in the empty agent are available. The storage of the empty mobile agents, each of which indicate an available resource, allows the agent space 112 to immediately assign and transfer a newly received mobile agent to the available resources as soon as the new mobile agent is received.

Referring again to the example described above, if the agent space determines that the empty agent matches a task defined in a mobile agent, the process of FIG. 7 continues in Step 4, where the agent space 112 communicates to the mobile agent 400 to the available resource computer. In the example involving the mobile agent 400 of FIG. 6A, the mobile agent 400 is transferred from the agent space 112 to the first brokered resource 106A for execution. As shown in Step 5, the first instruction set 412A may then execute a command or the series of transactions to achieve a desired task, such as the retrieval of specific e-mail records. During the execution of the first instruction set 412A, data records, such as compressed e-mail files, may be stored in the agent or communicated to a data repository, such as another brokered resource, for storage.

Once the tasks defined in the first instruction set 412A are executed, the process flow continues to Step 6 where the mobile agent is returned to the agent space. Upon receipt of the mobile agent, the agent space service 112 repeats the process of Step 5 and determines if an empty agent having matching parameters resides in the agent space. As described above, a matching empty agent indicates the availability of a resource that can execute code, such as the second instruction set 412B of the mobile agent 400. If the broker server 114 determines that it does not contain an empty agent having resources that match the requirements of the second instruction set 412B, the mobile agent 400 resides in an agent space until the agent space service 112 receives an indication that a brokered resource has available resources that match the requirements of the second instruction set 412B.

The process shown in FIG. 7 continues at Step 7 when the appropriate brokered resource, in this case the second brokered server 106B, sends a signal indicating that it has available computing resources. Similar to Step 3, the second brokered resource 106B may communicate the availability of its resources by the use of any type of message, including the use of an empty agent. Once the agent space receives an indication that the second brokered resource 106B has an available computing resource, the agent space service 112 determines if the available resources match the task requirements defined in one or more stored mobile agents. In this example, the agent space 112 would determine that the available resource of the second brokered resource 106B matches the task requirements of the second instruction set 412B of the mobile agent 400.

Next, as shown in Step 8, the mobile agent 400 is sent to the second brokered resource 106B for execution. In the execution of the second instruction set 412B, as shown in step 9, the mobile agent may be configured to process the compressed data records stored in the mobile agent. The mobile agent may also transmit the processed data to a specific database, such as one stored in another brokered resource. Once the processing of the second instruction set 412B is complete, as shown in Step 10, the mobile agent 400 is returned to the agent source to complete the execution of additional tasks, if any.

By the configuration of the above-described embodiments, it is possible to efficiently process, manage, and monitor data, such as electronic evidence data, from a user control unit. Among other features and benefits, the embodiments disclosed herein allow for improved management of processes executed on a plurality of computers. The configuration of the graphical user interface, in combination with the process management features, provides an improved method for configuring a workflow process for managing and processing large quantities of data over a network of distributed resource computers.

In one particular application of the present invention, the embodiments described herein may be used for configuring the workflow processes of electronic evidence data. In accordance with the present invention, electronic evidence data can be any data that is related to any litigation, hearing, settlement negotiation, regulatory or law enforcement investigation, or other like matter. Electronic evidence can also be any computer data file that is the subject of any evidence discovery or any computer data file that is sought to be excluded from an evidence discovery procedure, such as a work product. The system and method of the present invention can also be used to process relevant information from voluminous storage banks of electronic mail, computer applications, and other electronic sources. The system and method may be configured to recover data that has been deleted, tampered with, damaged, or hidden. In one specific application, the embodiments disclosed herein can be configured to collect electronic evidence data from a number of remote computing devices by the use of mobile agents. The mobile agents can be configured to search for specific data files and coordinate a data transfer of desired data files to a centralized computing system.

While several embodiments of the invention have been illustrated and described, it will be appreciated that various changes can be made therein without departing from the scope of the invention. Similarly, any process steps described herein might be interchangeable with other steps in order to achieve the same result. In addition, the illustrative examples described above are not intended to be exhaustive or to limit the invention to the precise forms disclosed. For instance, although the disclosed embodiments are directed to tasks that are distributed over a network of computers, various embodiments, such as the process priority schema, may be used for other processes distributed in multiple processor computers and other multitasking systems.

REFERENCE TO COMPUTER PROGRAM

A CDROM having sample program code, listed as Appendix A-F, has been contemporaneously filed with this specification. The files submitted in said CDROM are listed as follows:

| Machine Format: | IBM-PC | | | |
|---|---|---|---|---|
| Operating System: | Windows | | | |
| File Name | | Size | Type | Created |
| Agent-A.cs | | 11 KB | CS File | Feb. 5, 2003 |
| AgentDescription-B.cs | | 2 KB | CS File | Feb. 6, 2003 |
| AgentTask-C.cs | | 4 KB | CS File | Feb. 6, 2003 |
| Broker-D.cs | | 4 KB | CS File | Feb. 6, 2003 |
| HelloWorldAction-E.cs | | 3 KB | CS File | Feb. 5, 2003 |
| HellowWorldAgentBlueprint-F.xml | | 1 KB | XML Doc. | Feb. 6, 2003 |

The subject matter of these files is specifically incorporated herein by reference.

The embodiments of the invention in which an exclusive property or privilege is claimed are defined as follows:

1. A method for configuring a data management system, the data management system comprising a plurality of computers storing a plurality of records thereon, wherein the method comprises:
generating a graphical user interface for displaying a set of expressions that are graphically representative of a plurality of computer implemented functions for applying a unified record management policy to a network of computers, said functions comprising a process, a portion of a process, and at least one linking object that allows a user to graphically link the expressions,
wherein a subset of the expressions are representative of a plurality of objects of the data management system,
wherein the set of expressions allows the receipt of properties associated with the objects, and
wherein the graphical user interface enables a user to:
select expressions from the set of expressions;
graphically arrange the selected expressions on a display unit with one or more linking objects that graphically link the selected expressions to create a desired workflow that defines a path in which data is processed, and
configure the selected expressions to create a set of configured expressions that implement a unified record management policy for scheduled maintenance, transfer and deletion of data on a network of computers;
communicating the graphical user interface to a display unit;
receiving the set of configured expressions representative of the plurality of computer implemented functions that implement the unified record management policy;
generating a mobile agent having executable code configured in accordance to the set of configured expressions; and
communicating the mobile agent to at least one resource computer different from the computer on which the mobile agent was generated, for execution of the code, wherein the execution of the code implements the unified record management policy on the at least one resource computer receiving the mobile agent.

2. The method of claim 1, wherein the implementation of the unified record management policy comprises:
determining if records of said plurality of records have been stored for a predetermined time period;
selecting the records of said plurality of records that have been stored for a time longer than the predetermined time period; and
deleting the selected records.

3. The method of claim 1, wherein the implementation of the unified records management policy comprises:
determining if records of said plurality of records have been stored for a predetermined time period;
selecting the records of said plurality of records that have been stored for a time longer than the predetermined time period; and
transferring the selected records to a storage device.

4. The method of claim 1, wherein a set of displayed icons represents the set of expressions.

5. A computer-readable medium having computer readable instructions capable of performing the method recited in claim 1.

6. A method for processing electronic evidence, wherein the method comprises:
generating a graphical user interface for displaying a set of expressions that are graphically representative of a plurality of computer implemented functions for processing electronic evidence data, said functions comprising a process, a portion of a process, and at least one linking object that allows a user to graphically link the expressions,
wherein a subset of the expressions is representative of a plurality of objects,
wherein the set of expressions allows the receipt of properties associated with the objects, and wherein the graphical user interface enables a user to:
select expressions from the set of expressions;
graphically arrange the selected expressions on a display unit with one or more linking objects that graphically link the selected expressions to create a desired workflow that defines a path for processing electronic evidence data, and
configure the selected expressions to create a set of configured expressions;
communicating the graphical user interface to a display unit;
receiving the set of configured expressions representative of the plurality of computer implemented functions that are configured to perform one or more customized tasks on a computer in a distributed network of computers, wherein the customized tasks are configured to process the electronic evidence data in accordance with the user-created workflow;
generating a mobile agent having code configured in accordance to the set of configured expressions;
communicating the mobile agent to at least one resource computer different from the computer on which the mobile agent was generated, for execution of the code stored in the mobile agent; and
executing one or more tasks defined in the code to process the electronic evidence data.

7. The method of claim 6, wherein executing one or more tasks includes:
collecting selective records of electronic evidence data; and
storing the selective records of electronic evidence data in a memory unit.

8. The method of claim 6, wherein a set of displayed icons represents the set of expressions.

9. A computer-readable medium having computer readable instructions capable of performing the method recited in claim 6.

10. A data management system having improved configuration capabilities, the system comprising:
a first computing device having a processing unit and a memory with executable code for providing an agent factory, wherein the first computing device is communicatively connected to a network, wherein the agent factory comprises a mobile agent management tool configured to generate a graphical user interface for displaying a set of expressions that are graphically representative of a plurality of computer implemented functions for applying a unified record management policy to a network of computers, said functions comprising a process, a portion of a process, and at least one linking object that allows a user to graphically link the expressions,
wherein a subset of the expressions is representative of a plurality of objects of the data management system,
wherein the set of expressions allows the receipt of properties associated with the objects, and
wherein the graphical user interface enables a user to interact with a display unit of the first computing device and via the display unit:
select expressions from the set of expressions;
graphically arrange the selected expressions with one or more linking objects that graphically link the selected expressions to create a desired workflow that defines a path in which data is processed, and
configure the selected expressions to create a set of configured expressions that implement a unified record management policy for scheduled maintenance, transfer and deletion of data on a network of computers; and
at least one remote computer, wherein the remote computer is communicatively connected to the network, and wherein the first computing device is configured with executable program code for:
receiving the set of configured expressions representative of the plurality of computer implemented functions that implement the unified record management policy on the at least one remote computer;
generating a mobile agent having executable code configured in accordance to the set of configured expressions; and
communicating the mobile agent to the at least one remote computer for execution of the code, wherein the execution of the code implements the unified record management policy on the at least one remote computer.

11. A data management system having improved configuration capabilities, the system comprising:
a first computing device having an agent factory application, wherein the first computing device is communicatively connected to a network, wherein the agent factory comprises a mobile agent management tool configured to generate a graphical user interface for displaying a set of expressions that are graphically representative of a plurality of computer implemented functions for processing electronic evidence data, said functions comprising a process, a portion of a process, and at least one linking object that allows a user to graphically link the expressions,
wherein a subset of the expressions is representative of a plurality of objects,
wherein the set of expressions allows the receipt of properties associated with the objects,
wherein the graphical user interface enables a user to:
select expressions from the set of expressions;
graphically arrange the selected expressions on a display unit with one or more linking objects that graphically link the selected expressions to create a desired workflow that defines a path for processing electronic evidence data, and
configure the selected expressions to create a set of configured expressions, and
wherein the first computing device is further configured to communicate the graphical user interface to a display unit; and
at least one remote computer, wherein the remote computer is communicatively connected to the network, and wherein the first computing device is configured with executable program code for:
receiving the set of configured expressions representative of the plurality of computer implemented functions that are configured to perform one or more customized tasks on the at least one remote computer, wherein the customized tasks are configured to process the electronic evidence data in accordance with the user-created workflow;
generating a mobile agent having code configured in accordance to the set of configured expressions;
communicating the mobile agent to the at least one remote computer for execution of the code stored in the mobile agent; and
executing one or more tasks defined in the code to process the electronic evidence data.

12. A method for managing a number of distributed processes, wherein the method comprises:

receiving at least one mobile agent having program code defining a desired workflow that defines a path in which data is processed, said workflow resulting from a set of user-configured expressions that are representative of a plurality of computer implemented functions, said functions comprising a process, a portion of the process, and at least one linking object that allows a user to graphically link the expressions to create the workflow, wherein a subset of the expressions is representative of data objects stored on a computing device, and wherein the program code defines execution requirements for a resource to execute the program code;

receiving a signal from at least one computing device indicating that the at least one computing device contains an available computing resource;

determining if the available computing resource matches the execution requirements of program code stored in at least one mobile agent; and if the available computing resource matches the execution requirements of program code stored in at least one mobile agent, transmitting the mobile agent having the matching requirements to the at least one computing device containing the available computing resource for execution of the mobile agent.

13. The method of claim 12, wherein the method is applied to a distributed computer system having a plurality of brokered services configured to transmit a signal indicating that it contains at least one available computing resource.

14. A computer-readable medium having computer readable instructions capable of performing the method recited in claim 12.

15. A system comprising at least one server having a processing unit and a memory with executable code, wherein the processing unit is configured to:

receive at least one mobile agent having program code defining a desired workflow that defines a oath in which data is processed, said workflow resulting from a set of user-configured expressions that are representative of a plurality of computer implemented functions, said functions comprising a process, a portion of the process, and at least one linking object that allows a user to graphically link the expressions to create the workflow, wherein a subset of the expressions is representative of data objects stored on a computing device and wherein the program code defines execution requirements for a resource to execute the program code;

receive an indication from at least one computing device that the computing device contains an available computing resource;

determine if the available computing resource matches the execution requirements of a mobile agent; and if the available computing resource matches the execution requirements of a particular mobile agent, then transmit the particular mobile agent to the computing device containing the available computing resource for execution of the mobile agent.

* * * * *

UNITED STATES PATENT AND TRADEMARK OFFICE
CERTIFICATE OF CORRECTION

| | |
|---|---|
| PATENT NO. | : 7,475,107 B2 |
| APPLICATION NO. | : 10/361749 |
| DATED | : January 6, 2009 |
| INVENTOR(S) | : C. Maconi et al. |

It is certified that error appears in the above-identified patent and that said Letters Patent is hereby corrected as shown below:

| COLUMN | LINE | ERROR |
|---|---|---|
| 20 (Claim 15, | 8 line 5) | "oath" should read "path" |

Signed and Sealed this

Twenty-first Day of July, 2009

JOHN DOLL
*Acting Director of the United States Patent and Trademark Office*